United States Patent [19]
Bowser

[11] 4,088,221
[45] May 9, 1978

[54] STOP APPARATUS FOR PALLETIZERS AND THE LIKE

[75] Inventor: Robert E. Bowser, Lynchburg, Va.

[73] Assignee: Simplimatic Engineering Co., Lynchburg, Va.

[21] Appl. No.: 719,955

[22] Filed: Sep. 2, 1976

[51] Int. Cl.² .......................................... B65G 47/29
[52] U.S. Cl. ................... 198/491; 198/780; 193/35 A; 198/633
[58] Field of Search ............... 198/368, 442, 451, 491, 198/492, 599, 633, 780, 781; 193/35 A; 214/6 P

[56] References Cited

U.S. PATENT DOCUMENTS

| | | | |
|---|---|---|---|
| 2,065,855 | 12/1936 | Ferm | 198/633 |
| 3,107,019 | 10/1963 | Malzahn et al. | 198/633 |
| 3,251,452 | 5/1966 | Conway et al. | 198/780 |
| 3,376,965 | 4/1968 | Tregoning et al. | 193/35 A |
| 3,493,095 | 2/1970 | Messerly | 198/491 |
| 3,700,127 | 10/1972 | Kurk et al. | 214/6 P |
| 3,724,642 | 4/1973 | DeGood | 193/35 A |
| 3,760,932 | 9/1973 | Schneider | 198/781 |
| 3,768,630 | 10/1973 | Inwood et al. | 198/781 |
| 3,789,960 | 2/1974 | Warren | 193/35 A |
| 3,881,585 | 5/1975 | Coleman et al. | 193/35 A |

FOREIGN PATENT DOCUMENTS

| | | | |
|---|---|---|---|
| 2,226,096 | 12/1973 | Germany | 193/35 A |
| 923,984 | 4/1963 | United Kingdom | 193/35 A |
| 933,863 | 8/1963 | United Kingdom | 193/35 A |
| 1,178,094 | 1/1970 | United Kingdom | 198/781 |

Primary Examiner—Evon C. Blunk
Assistant Examiner—Richard K. Thomson
Attorney, Agent, or Firm—James & Franklin

[57] ABSTRACT

Conveyor apparatus comprises a series of spaced rollers defining thereover a travel path for articles and an article stop located adjacent and downstream with respect to one of the rollers and movable between an extended position and a retracted position. In its extended position, the article stop extends into the travel path to obstruct passage of articles from the roller, and in its retracted position the article stop is spaced from the travel path to permit passage of articles from the roller. A roller stop is secured to the article stop and movable therewith, the roller stop being operatively disengaged from the roller when the article stop is in the retracted position and operatively engaged with the roller when the article stop is in the extended position. Operative engagement of the roller stop with the roller inhibits rotation of the roller and thus reduces the momentum with which an article engages the article stop.

18 Claims, 4 Drawing Figures

STOP APPARATUS FOR PALLETIZERS AND THE LIKE

BACKGROUND OF THE INVENTION

The present invention relates to conveyor apparatus including a stop and, in particular, to such apparatus useful in palletizers.

A palletizer is a mechanism which automatically arranges incoming cartons or other objects, hereinafter generally termed "cartons" for purposes of simplicity, into rows which are then formed into tiers or layers. The formed tiers are subsequently deposited successively onto a pallet which, when fully loaded, is moved from the mechanism by a fork-lift truck or the like for storage or shipping.

Palletizers are manufactured in a variety of different forms, but, in general, may comprise a carton orienting means, a row forming means, a layer or tier forming means, an elevator or hoist located below the draw plate upon which the formed layers or tiers are successively deposited, and a means for conveying empty pallets to the elevator or hoist and for removing loaded pallets from the elevator or hoist.

Preferably the carton orienting means includes a carton inverter and a means for turning the carton through a 90° angle. Adjustable pattern guides and stops may also be provided. In fully automatic palletizers, the functions of the various portions of the mechanism are synchronized and controlled by a main control unit which may be programmable through the use of tape or other program media. By controlling the carton inverter, the means for turning the carton 90°, the row forming means with its stops and guides, and the tier forming means, a large variety of different load patterns can be achieved to provide the load stability and degree of compactness required by the particular size or shape and weight of the cartons involved.

In order to achieve a large variety of different load patterns automatically, it is necessary that the palletizer, and particularly the row forming means and the tier forming means, be quite versatile in operation. Versatility in forming different patterns is achieved by developing the capability to individually orient each carton in the pattern and also by the maintaining of gaps or spaces between adjacent cartons in a row as well as between cartons in adjacent rows.

It is relatively easy to establish a gap or space between adjacent cartons in a row. Many conventional row forming means comprise a roller table comprising a plurality of parallel oriented, spaced, copolanar rollers. The rollers are driven by a motor or the like which is actuated by the control unit in accordance with the program. Incoming cartons, after they are appropriately oriented, enter one side of the row forming table and are conveyed by the rollers towards an end stop at the other side of the table. If a gap or opening is required, a stop is provided at the appropriate location along the table in the form of a plate which is movable between two adjacent rollers from below the surface of the rollers to a position above the surface of the rollers. In its raised position, this stop prevents a carton from progressing any further along the table and thus serves to maintain a space or gap between the cartons, in the desired location, as the remainder of the cartons enter the row forming table. Thus, through the use of several strategically located stops, a row of cartons may be formed with spaces or gaps between adjacent cartons.

The stops utilized to form the spaces or gaps between adjacent cartons in a row may be actuated in any appropriate manner, such as by pneumatic or hydraulic cylinders. The control unit functions to synchronize the actuation of the stops. In this manner, the program is utilized to control the formation of the gaps or openings between adjacent cartons in the row. Thus, the formation of the openings or gaps between the adjacent cartons is variable to produce a variety of different row patterns.

After the row is formed on the row forming table, it is swept from the row forming table to a tier forming table. The tier forming table may comprise a plurality of driver rollers similar to those of the row forming table. Normally these rollers are oriented perpendicular to the rollers of the row forming table to permit the formed row to be swept from the row forming table in a direction perpendicular to the movement of the cartons on the row forming table, thereby maintaining the spaces or gaps therein.

As each row is received on the tier forming table, from the row forming table, the rollers of the tier forming table are driven to advance that row to the opposite end of the table. Thus, the first row received on the tier forming table is advanced until it is adjacent an end stop on the opposite end of the tier forming table. When the next row is received, the rollers are again driven such that this row is advanced against the first row. In this manner, each successive row is advanced by the movement of the rollers until it is adjacent the previous row.

As the formed rows of cartons are being swept from the row forming table to the tier forming table, the leading edge of some cartons may extend further than the leading edge of other cartons, either because the cartons are of a different size or because some cartons were reoriented (i.e., acted on by the means for turning the carton 90°) and others were not. In some instances, although not all, it may be desirable to align the leading edges of all the cartons of a given row as part of the tier forming process. For this purpose, the tier forming table may also be provided with one or more raisable stops essentially similar to those of the row forming table, but effective to provide an abutting surface for the leading carton edges so that, as the cartons of a given row are driven against the raised stop, the advanced leading edges are restrained until the lagging leading edges catch up.

The raisable stops, whether used on the row or tier table, contain upwardly projecting plate portions (called article stops or stop plates) which must be thin enough to pass between adjacent rollers, yet strong enough to stop the forward motion of the cartons. Depending upon the speed with which the cartons impinging upon the stop plate are travelling, and the weight of the cartons (including their contents), the cartons may be possessed of considerable momentum at the time they strike the stop plate. In extreme cases the impact may have the result of injuring the carton (that is, crumpling the forward edge of the carton which impinges upon the stop), damaging any fragile contents of the carton (for example, bottles or glassware), and deforming the stop plate to the point of non-functionality (for example, by ending it so far forward toward the adjacent upstream roller that the stop plate is either no longer movable to a retracted position or simply tilted so much that the leading edge of the next carton to hit the stop plate may tend to ride up the stop plate or even go over the stop plate).

Accordingly, it is an object of the present invention to provide a stop which is effective to reduce the momentum with which a carton impinges on the stop plate.

It is another object to provide such a stop which reduces the danger of damage to the carton and/or its contents as well as to the stop plate itself.

It is also an object to provide such a stop which is of relatively simple and rugged construction.

SUMMARY OF THE PRESENT INVENTION

It has now been found that the above and related objects of the present invention are obtained in a conveyor apparatus including a roller stop which is effective to inhibit rotation of a roller located adjacent and upstream with respect to the roller stop, and thus reduces the momentum with which an article engages the article stop.

More particularly, the conveyor apparatus comprises a series of spaced rollers defining thereover a travel path for articles. Stop means comprise an article stop located adjacent and downstream with respect to one of the rollers and movable between an extended position and a retracted position. In the extended position the article stop extends into the travel path, thereby to obstruct passage of articles from the roller, while in the retracted position the article stop is spaced from the travel path, thereby to permit passage of articles from the roller. The roller stop is secured to the stop means and movable with the article stop, the roller stop being operatively disengaged from the roller when the article stop is in the retracted position and operatively engaged with the roller when the article stop is in the extended position, thereby to inhibit the rotation of the roller and thus reduce the momentum with which an article engages the article stop.

Preferably the roller stop is movable relative to the stop means, and in particular the article stop thereof. The bottom of the roller stop is biased upwardly and/or outwardly relative to the stop means, and in particular relative to the article stop. The portion of the roller stop which effects the operative engagement with the roller preferably comprises a high friction surface extending upstream of the article stop and is effective to cause slippage of the roller relative to its frictional drive means.

In a preferred embodiment, the conveyor includes an abutment located adjacent and downstream with respect to the article stop. In this instance, the roller stop comprises a pair of bearing surfaces, an upstream one of the bearing surfaces extending upstream of the article stop and a downstream one of the bearing surfaces extending downstream of the article stop. The bearing surfaces are operatively disengaged from the roller and the abutment respectively when the article stop is in the retracted position, but operatively engaged with the roller and the abutment respectively when the article stop is in the extended position. Thus when the article stop is in its extended position the abutment is able to assist in maintaining the bearing of the roller stop against the upstream roller.

While the upstream bearing surface is preferably of high friction material, the downstream bearing surface is preferably of low friction material. The tops of both bearing surfaces preferably abut an upper portion of the article stop, and the bottoms of the bearing surfaces preferably are biased outwardly and/or upwardly relative to a lower portion of the article stop.

Typically, the abutment will comprise another of the rollers, one situated adjacent and downstream with respect to the article stop.

DETAILED DESCRIPTION OF THE PREFERRED EMBODIMENTS

Figure 1:
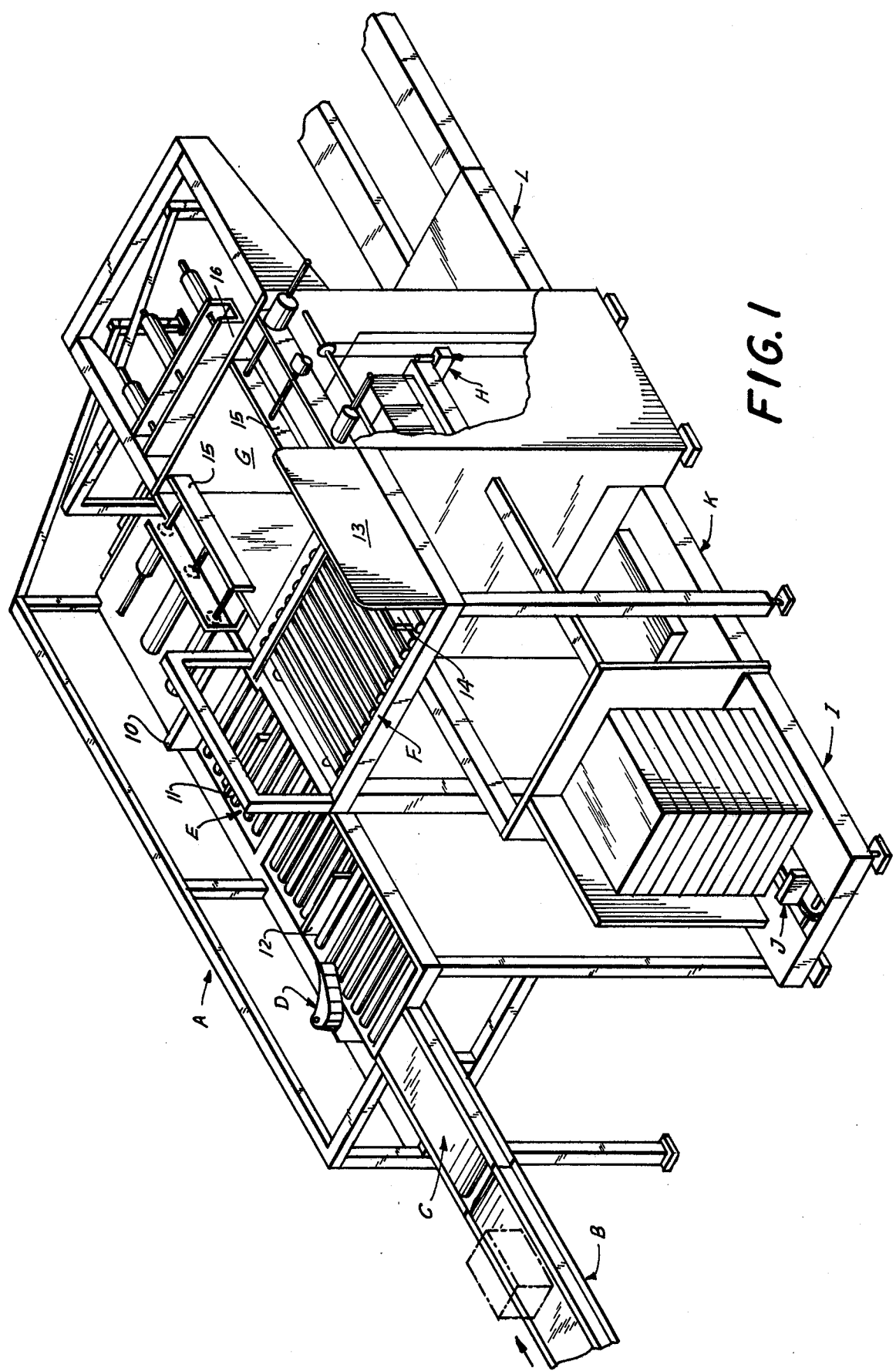
FIG. 1 is an isometric view of the palletizer of the type which may include a conveyor apparatus according to the present invention.

The roller stop of the present invention can be utilized in connection with any conveyor apparatus comprising a series of spaced rollers defining thereover a travel path for articles and stop means comprising a raisable article stop. However, a prime application for such a roller stop is the conveyor apparatus used in the row forming and tier forming tables of automatic palletizers. Automatic palletizers may have a variety of different components which may in turn be arranged in a variety of different orientations. However, for purposes of illustration only, FIG. 1 depicts an automatic palletizer representative of the type of palletizers with which the present invention may be utilized. The palletizer comprises a support structure, generally designated A, including vertical and horizontal supporting elements, as well as an operator's platform and stairways providing access thereto. Structure A may be arranged in a variety of different manners, depending upon the particular requirements of the palletizer.

Incoming cartons enter the palletizer by an infeed conveyor, generally designated B. Apparatus for flap closing and setting (not shown) and for carton inverting (not shown) may be utilized prior to infeed conveyor B. As the cartons enter the palletizer by means of infeed conveyor B, they are metered by a brake-meter belt, generally designated C, one at a time, passing a photoelectric cell (not shown). The photoelectric cell counts the carton into the proper program pattern sequence. The brake-meter belt C delivers the carton to a carton turning apparatus, generally designated D, which serves to turn or rotate the carton 90°, if such a directional reorientation is called for by the program. Turning means D comprises an arm or flipper pivotally mounted on the side of the carton path which, when appropriately positioned, engages one corner of the carton causing the carton to rotate about that corner such that the carton is reoriented 90° with respect to its original position.

The carton is then conveyed to a row forming table, generally designated E, wherein the appropriate number of cartons are accumulated to form a row. The row forming means may comprise a conveyor-style roller table having a plurality of powered rollers. A full solid row of cartons are formed against each other and held by a fixed, but position adjustable backstop 10. Should the row formation require spaces or gaps between adjacent cartons, one or more row stops 11 may be raised by a hydraulic or pneumatic cylinder (not shown) between the driven rollers of the row table at the appropriate positions. The row stops are adjusted to proper spacing for the various carton sizes and pattern variations.

When the row is completed, a row gate 12 is raised in a manner similar to that of the row stops. Row gate 12 separates the incoming cartons from the completed row until the row sweep is completed. After the row sweep is completed, the row gate 12 retracts and the next row continues to form.

The row sweep (not shown) pushes the formed row onto a tier forming table, generally designated F, which is a conveyor-style roller table similar to the row forming table. After the row sweep has placed the row on the tier table F, the rollers thereon can be driven to advance the row against a fixed but position adjustable tier table end stop 13 to position the row at the proper position for a tier sweep and permit clearance space for receiving the next row in sequence. The procedure is repeated until the total number of rows required to form a full tier or layer have been placed on the tier table F. The tier table F is preferably provided with one or more pneumatically or hydraulically raisable tier stops 14, similar to raisable stop 11 of the row forming table E.

After the entire tier is formed in position on tier table F, a tier sweep (not shown) pushes the full tier onto the draw plate, generally designated G. The tier pattern is guided onto the draw plate G by means of side guides 15, adjustable to the dimensional width of the pattern and are swept against an end stop guide 16, position adjustable to the length of the pattern. When the pattern is in placed on draw plate G, the end stop guide 16 holds the tier pattern in position for retraction of the draw plate.

Immediately beneath draw plate G is a vertically movable hoist or elevator, generally designated H, upon which a pallet is situated. A stack of pallets is placed in the pallet infeed area, generally designated I. One pallet at a time is moved from the bottom of the stack and transferred by means of a pallet moving mechanism, generally designated J, to a pallet ready stage, generally designated K, wherein it is loaded on a hoist, generally designated H, immediately after the removal of the loaded pallet therefrom. The loaded pallet is transferred to a pallet outfeed area, generally designated L, where it may be conveniently removed by a fork-lift truck or the like or, alternatively, automatically transferred to a storage area.

The stop of the present invention is useful as the raisable row stop 11 of the conveyor apparatus of the row forming table E and as the raisable tier stop 14 of the conveyor apparatus of the tier forming table F; its principles are furthermore equally applicable to incorporation in row table backstop row gate 10, row gate 12 and tier table end stop 13. One or more of the stops may be utilized on each table E, F and indeed with any series of spaced rollers. The motive power for the stop (i.e., the power which selectively drives it upwardly or downwardly) may be pneumatic, hydraulic, or of any other conventional type.

Figure 2:
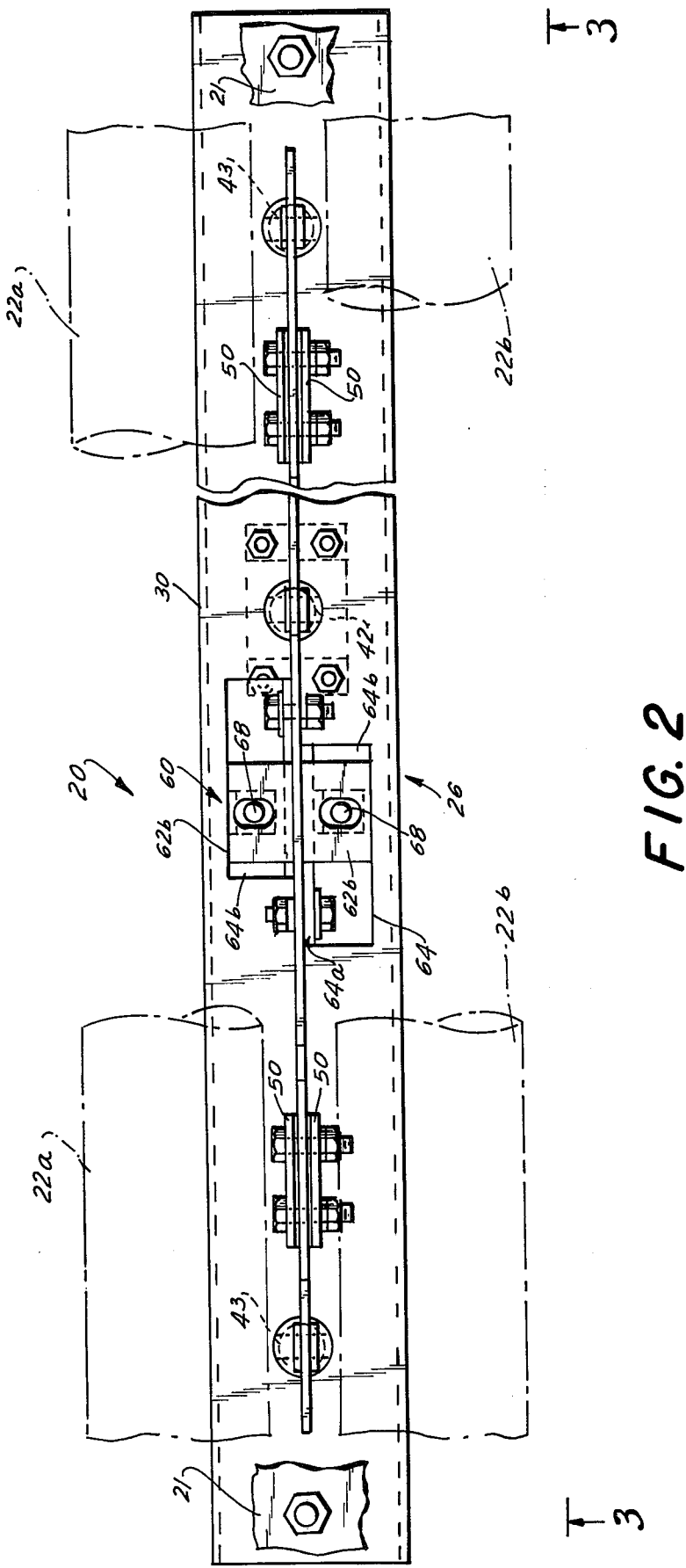
FIG. 2 is a fragmentary top plan view of a conveyor apparatus according to the present invention.
Figure 3:
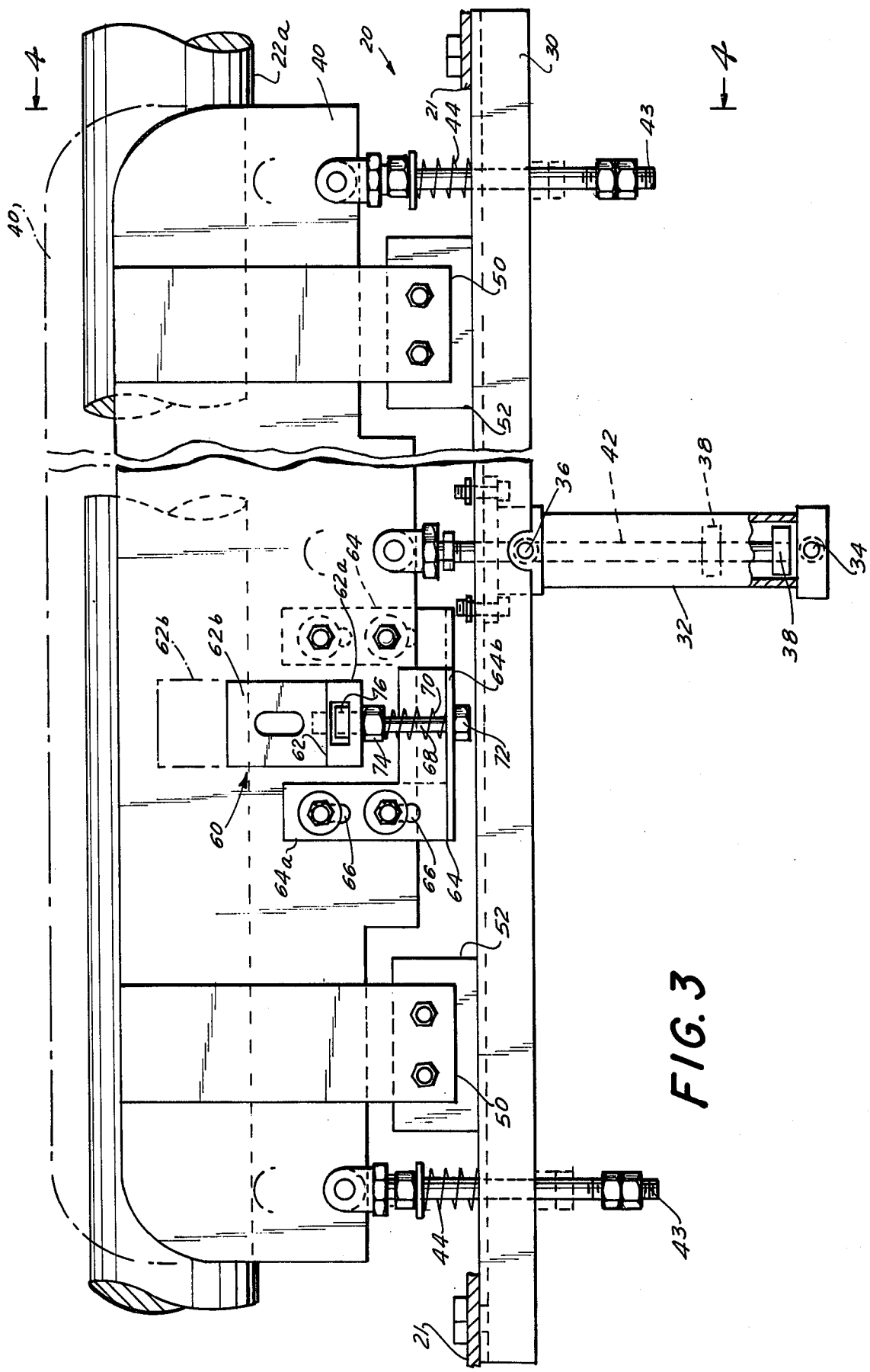
FIG. 3 is a fragmentary front elevation view taken along the line 3—3 of FIG. 2.
Figure 4:
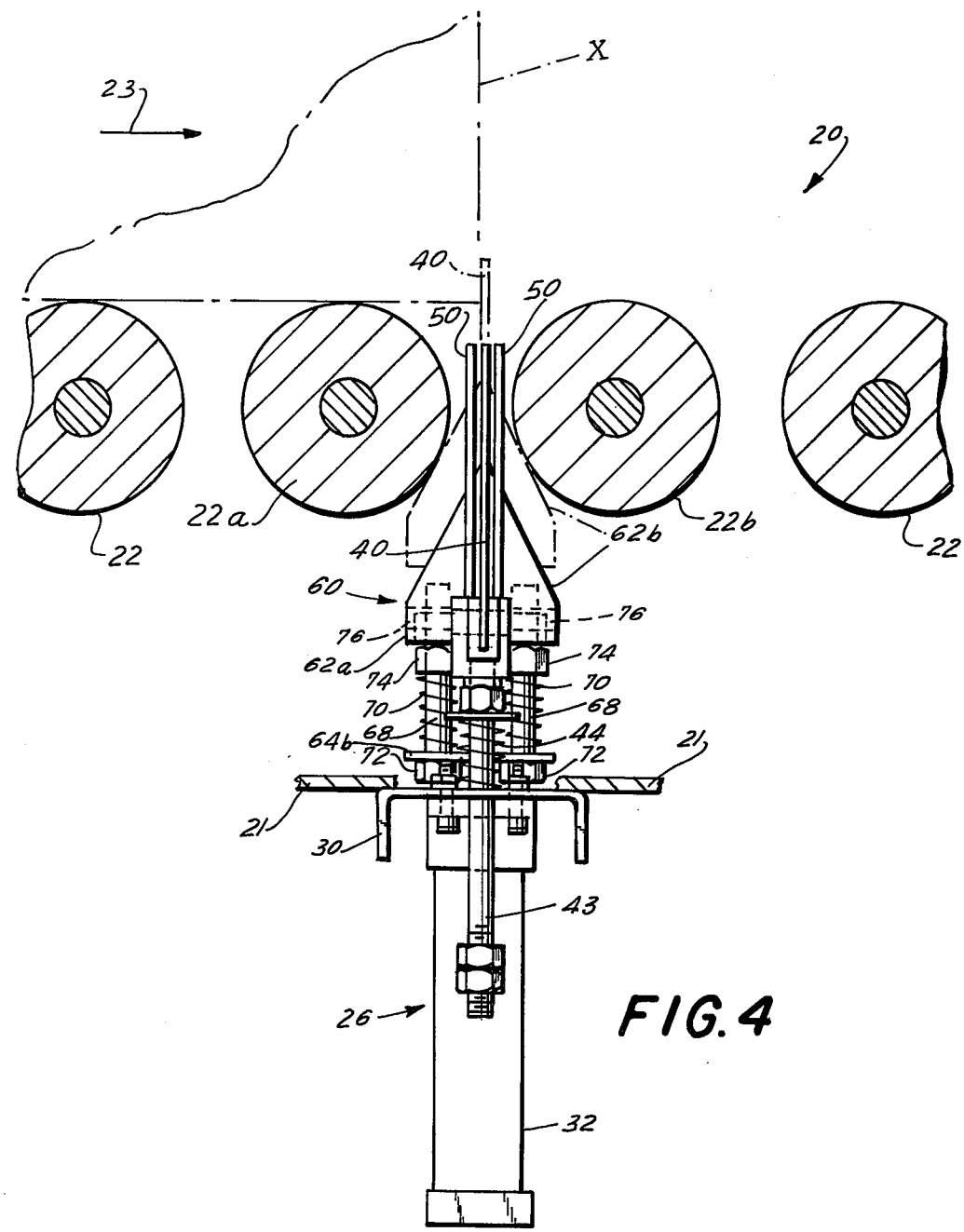
FIG. 4 is a fragmentary side elevation view, partially in cross-section, taken along the line 4—4 of FIG. 3.

Referring now to FIGS. 2-4, therein illustrated is conveyor apparatus, generally designated 20, according to the present invention. As best seen in FIG. 4, the conveyor apparatus 20 comprises a frame 21 and a series of spaced, parallel, co-planar rollers 22 journaled in frame 21 and defining thereover a path for articles, such as the carton X illustrated in phantom line, traveling in the direction of Arrow 23. The conveyor apparatus 20 may additionally include means (not shown) for driving the rollers 22, the drive means preferably being of the frictional engagement type (such as a friction belt) permitting slippage of a given loaded roller 22 relative to the drive belt without impeding the driving of the other rollers 22.

Secured to the conveyor apparatus frame 21 is a stop means, generally designated 26, including a conventional article stop. In its conventional aspects, the stop means 26 comprises a stationary base plate 30 in the form of an inverted U, the ends thereof being secured to frame 21. Depending from the base plate 30 is an air cylinder 32 equipped with an inlet 34, an outlet 36, and a piston 38 capable of moving between a retracted position adjacent the base of the cylinder (shown in solid line in FIG. 3) and an extended position closer to the top of the cylinder 32 (indicated in phantom line in FIG. 3). A control mechanism (not shown) operating on a predetermined sequence (which may be dependent on the passage of time, the number of cartons passing a given point, or even manual actuation) selectively connects and disconnects the air inlet 34 to an air supply (not shown) and outlet 36 to the atmosphere, thereby providing for lowering and raising of the piston 38 as desired. Of course, the pneumatic mechanism described and shown may be replaced by hydraulic or other conventional mechanisms for raising and lowering the article stop relative to base plate 30.

An article stop plate 40 is connected to the piston 38 by means of a piston rod 42, so that as the piston travels between its retracted and extended positions, the stop plate 40 also travels between its retracted position (shown in solid line) and its extended position (shown in phantom line). The length of travel of the piston 38 is such that the stop plate 40 in its retracted position is spaced below the plane of the upper portions of the rollers 22 defining the travel path of articles X, while the stop plate 40 in its extended position is spaced above the plane and thus effective to obstruct passage of the articles X from the upstream roller 22a to the downstream roller 22b.

To preclude wobbling of the stop plate 40 from side to side and to further assist it in maintaining its extended position, each end portion of stop plate 40 is further connected to the base plate 30 by means of guide rod 43. Each guide rod 43 extends through an associated aperture in base plate 30 and is movable with respect to base plate 30 between a retracted position (shown in solid line in FIG. 3) and an extended position (shown in phantom line in FIG. 3), the guide rod 43 being biased upwardly by a compression spring 44 to its extended position. To prevent wobbling of the stop plate 40 forwardly and rearwardly (i.e., in the upstream and downstream directions), two guide bars 50 are provided for each end portion of stop plate 40, one guide bar 50 being provided adjacent to (but spaced from) the upstream surface of the stop plate end portion and one being provided adjacent to (but spaced from) the downstream surface of the stop plate end portion. The forward and rear guide bars 50 adjacent each end portion are secured to a lug 52 atop base plate 30 and extended upwardly substantially to the top of the stop plate 40 in its retracted position. The stop plate 40 and guide bars 50 are made of strong but very thin sheets of material, typically metal, the combined thickness of the stop plate 40 and its front and rear guide bars 50 (including the spacing therebetween) being such as to enable the unit to be disposed between a pair of adjacent rollers 22a, 22b.

As the stop means 26 thus far described is conventional in nature, further details of its construction and operation will be readily apparent to those skilled in the art and need not be described in further detail herein.

Turning now to the novel features of the conveyor apparatus 20 according to the present invention, a roller stop, generally designated 60, is secured to the stop means 26 and movable with the stop plate 40 between a retracted position (shown in solid line) and an extended position (shown in phantom line). The roller stop 60 comprises vertically extending hollow shoe wedge blocks 62, disposed on either side of article stop 40 intermediate guide bars 50. Each brake shoe wedge block 62 is secured to the stop plate 40 by means of an associated "L"-shaped brake shoe support bracket 64, one bracket 64 being disposed on each side of stop plate 40.

To enable adjustment of the height of the brake block 62 along the height of the stop plate 40, vertically extending leg 64a of the brake bracket 64 is secured to the stop plate 40 by means of a nut and bolt combination in which the bolt passes thrugh a circular apertures in the stop plate 40 and a vertically elongated aperture 66 in the brake bracket leg 64a. Thus the nut and bolt combination may be loosened to allow the brake braket 64 to be moved vertically along the stop plate 40 to insure that the brake block 62 is operatively disengaged (i.e., spaced) from the rollers 22a, 22b when the stop plate 40 is in its retracted position and operatively engaged with the rollers 22a, 22b when the stop plate 40 is in its extended position (as shown in phantom line in FIG. 3).

To enable limited vertical movement of each brake block 62 relative to the stop plate 40, so that the engagement of a brake block 62 and roller 22 is resilient rather than rigid, the horizontally extending leg 64b of the brake bracket 64 supports the brake block 62 thereabove by means of a bolt 68 and compression spring 70. The bolt passes through an aperture in brake bracket leg 64b and an aperture in brake block bottom 62a and carries three nuts, nut 72 immediately below the brake bracket leg 64b, nut 74 immediately below the brake block bottom 62a, and nut 76 immediately above the brake block bottom 62a. Thus the brake block 62 is fixed for movement with bolt 68, but the bolt 68 is movable relative to brake bracket leg 64b. Compression spring 70 is disposed along the axis of bolt 68 intermediate the brake bracket leg 64b and nut 74 and thus biases bolt 68 (and so brake block 62) upwardly.

The design of the bearing surface 62b of each brake block 62 is such that it extends downwardly and outwardly from approximately a mid-point of the stop plate 40. The compression spring 70 acting along the axis of bolt 68 thus biases the brake block 62 both upwardly and outwardly (i.e., towards rollers 22). However, obviously other means for biasing the brake block 62 upwardly and/or outwardly may be utilized in place of compression spring 70. Indeed, the brake block 62 may be fixed in position on the stop plate 40; however, in this case replacement of the brake block 62 due to wear will have to be more frequently performed or a manual repositioning of the brake block 62 relative to the stop plate 40 by means of the nut and bolt arrangement passing through vertically extending apertures 66 will have to be performed more frequently. Furthermore, if brake block 62 is fixedly positioned on stop plate 40 in the wrong position (e.g., too high or too far out from the stop plate), damage may result to the rollers 22 or the stop plate 40 may be rendered ineffectual.

Both brake blocks 62 may be formed of the same high friction composition. However, as the purpose of the upstream brake block 62 is to inhibit rotation of the upstream roller 22a and the purpose of the downstream brake block 62 is merely to assist in maintaining the bearing of the upstream surface 62b against the roller 22a, preferably the upstream bearing surface 62b is formed of high friction material and the downstream bearing surface 62b is formed of low friction material. In this manner the heat generation caused by the frictional engagement of the brake bearing surfaces 62b with the adjacent rollers 22a, 22b is reduced, the frequency of the need for replacement of the downstream brake block 62 is reduced, and unnecessary wear on the downstream roller 22b is also reduced. Indeed, while the provision of a downstream brake block 62 is highly desirable because it enables the roller stop 60 to be wedged between adjacent rollers in a manner which increases the frictional force exerted by the upstream brake block 62 against the upstream roller 22a and also eliminates the possibility of the stop plate 40 becoming bent out of shape in the direction of the downstream roller 22b, clearly the downstream brake block 62 and its associated brake bracket 64 are not essential features of the present invention. Furthermore, it will be obvious that when the stop means 26 is utilized in conveyor apparatus 20 in which there is no roller 22b adjacent to and downstream of the stop apparatus 26 (for example, when the stop means 26 is used as a row table backstop 10 or tier table end stop 13), any abutment located adjacent and downstream with respect to the stop plate 40 may be employed in place of the absent downstream roller 22b.

Operation of the conveyor apparatus according to the present invention is basically similar to operation of conventional conveyor apparatus in which the stop means comprises only an article stop. As the control mechanism closes cylinder output 36 and connects cylinder input 34 with a fluid source, the piston 38 lifts stop plate 40 to its extended position (shown in phantom line in FIGS. 3 and 4). As stop plate 40 assumes its extended position, the guide bars 43 also rise under the influence of compression springs 44. Eventually, the stop plate 40 reaches its fully extended position where it is effective to obstruct travel of an article X from the upstream roller 22a to the downstream roller 22b. At this point the stop plate 40 has raised brake brackets 64 to a level at which the brake block bearing surfaces 62b on each side of the stop plate 40 are bearing against the adjacent rollers, roller 22a on the upstream side and roller 22b on the downstream side. By virtue of the abutment of its downstream surface against the upstream surface of the article stop 40, and its upward and outward biasing by spring 70, the upstream brake 62 frictionally bears on the lower downstream surface of upstream roller 22a, thereby causing slippage of the upstream roller 22a relative to the belt which is frictionally driving it. As the article X passes from the roller immediate upstream of roller 22a and contacts roller 22a, the slowed-down roller 22a exerts a braking action on the article X which at least partially counteracts the downstream driving force of the aforementioned roller 22 and tends to reduce the downstream speed (and hence the momentum) of the article X. Accordingly, the impact between the downstream edge of article X and the upstream surface of stop plate 40 is substantially reduced, thereby diminishing the opportunity for damage to the carton, its contents, and the stop plate itself. Further, since the braking force has a component in the upstream direction, any tendency of the roller to move in the downstream direction will be effectively resisted. Where a downstream brake block 62 has been provided, the abutment thereof against the downstream roller 22b will assist in maintaining the stop plate 40 in its desired vertical position and thus in maintaining the bearing of the upstream brake block 62 against the upstream roller 22a.

Now that the preferred embodiments of the present invention have been shown and described in detail, various improvements and modifications thereon will become readily apparent to those skilled in the art. Accordingly, the spirit and scope of the present invention is to be limited only by the appended claims, and not by the foregoing disclosure.

I claim:

1. In conveyor apparatus comprising
   A. a series of spaced rollers defining thereover a travel path for articles; and
   B. stop means comprising an article stop located adjacent and downstream with respect to one of said rollers and movable between an extended position in which said article stop extends into said travel path, thereby to obstruct passage of articles from said roller, and a retracted position in which said article stop is spaced from said travel path, thereby to permit passage of articles from said roller;
   the improvement comprising a roller stop physically mounted on and connected to said stop means for movement with said article stop, said roller stop being operatively disengaged from said roller when said article stop is in said retracted position and operatively engaged with said roller when said article stop is in said extended position, thereby to inhibit rotation of said roller and thus reduce the momentum with which an article engages said article initially stop.

2. The apparatus of claim 1 additionally comprising means for driving said roller.

3. The apparatus of claim 2 wherein said drive means frictionally drives said roller.

4. The apparatus of claim 1 wherein said roller stop comprises a high friction surface extending upstream of said article stop which effects said operative engagement.

5. The apparatus of claim 1 wherein said roller stop is movable relative to said stop means.

6. The apparatus of claim 5 wherein said roller stop is movable relative to said article stop.

7. In conveyor apparatus comprising:
   A. a series of spaced rollers defining thereover a travel path for articles; and
   B. stop means comprising an article stop located adjacent and downstream with respect to one of said rollers and movable between an extended position in which said article stop extends into said travel path, thereby to obstruct passage of articles from said roller, and a retracted position in which said article stop is spaced from said travel path, thereby to permit passage of articles from said roller;
   the improvement comprising a roller stop operatively connected to said article stop for movement when said article stop moves, a portion of said roller stop being configured and dimensioned to engage the downstream side of said roller and exert thereon a component of force acting parallel to said travel path and against said roller when said article stop is in said extended position; whereby said component of force resists any tendency of the articles to carry said roller downstream therewith.

8. The apparatus of claim 7 wherein said portion of said roller stop is movable relative to said article stop and said component of force is directed outwardly from said article stop.

9. The apparatus of claim 1 wherein the bottom of said roller stop is biased upwardly relative to said stop means.

10. The apparatus of claim 6 wherein the bottom of said roller stop is biased upwardly relative to said article stop.

11. The apparatus of claim 7 wherein the bottom of said roller stop is biased upwardly relative to said stop means.

12. The apparatus of claim 8 wherein the bottom of said roller stop is biased upwardly relative to said article stop.

13. In conveyor apparatus comprising
    A. a series of spaced rollers defining thereover a travel path for articles;
    B. stop means comprising an article stop located adjacent and downstream with respect to one of said rollers and movable between an extended position in which said article stop extends into said travel path, thereby to obstruct passage of articles from said roller, and a retracted position in which said article stop is spaced from said travel path, thereby to permit passage of articles from said roller; and
    C. an abutment located adjacent and downstream with respect to said article stop;
    the improvement comprising a roller stop operatively connected to said stop means, movable when said article stop moves, and including a pair of bearing surfaces, an upstream one of said bearing surfaces extending upstream of said article stop and a downstream one of said bearing surfaces extending downstream of said article stop, said bearing surfaces being operatively disengaged from said roller and said abutment respectively when said article stop is in said retracted position and being operatively engaged with said roller and said abutment respectively when said article stop is in said extended position, whereby said abutment assists in maintaining the bearing of said roller stop against said roller to inhibit rotation of said roller and thus reduce the momentum with which an article engages said article stop.

14. The apparatus of claim 13 wherein said upstream bearing surface is of high friction material.

15. The apparatus of claim 14 wherein said downstream bearing surface is of low friction material.

16. The apparatus of claim 13 wherein the tops of said bearing surfaces abut an upper portion of said article stop, and the bottom of said bearing surfaces are biased outwardly and upwardly relative to a lower portion of said article stop.

17. The apparatus of claim 13 wherein said abutment comprises another of said rollers.

18. The apparatus of claim 15 wherein said abutment comprises another of said rollers.

* * * * *